United States Patent
Windeshausen (10) Patent No.: US 11,850,813 B2
(45) Date of Patent: Dec. 26, 2023

(54) TIRE MOLD

(71) Applicant: The Goodyear Tire & Rubber Company, Akron, OH (US)

(72) Inventor: Michel Jean Yves Windeshausen, Messancy (BE)

(73) Assignee: The Goodyear Tire & Rubber Company, Akron, OH (US)

(*) Notice: Subject to any disclaimer, the term of this patent is extended or adjusted under 35 U.S.C. 154(b) by 106 days.

(21) Appl. No.: 17/544,461

(22) Filed: Dec. 7, 2021

(65) Prior Publication Data

US 2022/0194038 A1 Jun. 23, 2022

Related U.S. Application Data

(60) Provisional application No. 63/127,253, filed on Dec. 18, 2020.

(51) Int. Cl.
*B29D 30/06* (2006.01)
*B33Y 80/00* (2015.01)
*B60C 11/12* (2006.01)

(52) U.S. Cl.
CPC .......... *B29D 30/0629* (2013.01); *B33Y 80/00* (2014.12); *B60C 11/124* (2013.01); *B29D 2030/063* (2013.01); *B29D 2030/0613* (2013.01); *B29D 2030/0617* (2013.01)

(58) Field of Classification Search
CPC ........ B29D 2030/0613; B29D 30/0629; B60C 11/124
See application file for complete search history.

(56) References Cited

U.S. PATENT DOCUMENTS

| | | |
|---|---|---|
| 6,193,492 B1 | 2/2001 | Agnier et al. |
| 2006/0008547 A1 | 1/2006 | Ohara |
| 2006/0269636 A1 | 11/2006 | Miyamae |
| 2009/0035404 A1 | 2/2009 | Hana et al. |

FOREIGN PATENT DOCUMENTS

| | | |
|---|---|---|
| EP | 2777922 A1 | 9/2014 |
| JP | 2002316328 A | 10/2002 |
| WO | 03013882 A1 | 2/2003 |
| WO | 2015090671 A1 | 6/2015 |

*Primary Examiner* — Xiao S Zhao
*Assistant Examiner* — John J DeRusso
(74) *Attorney, Agent, or Firm* — Alvin T. Rockhill (57) ABSTRACT

A tire mold comprising a tread mold portion divided into mold segments having transverse edges which are movable between (i) an opened position, wherein the mold segments are spaced apart, and (ii) a closed position, wherein neighboring mold segments are in contact with each other, each of the mold segments comprising blades; wherein at least a first one of the mold segments has laterally extending blades located at a first transverse edge, wherein at least a second neighboring one of the mold segments has laterally extending blades located at a second transverse edge adjacent to the first transverse edge of the first one of said the mold segments, and when in the closed position said the laterally extending blades of the first one of the mold segments interlock between the laterally extending blades of the second one of said the mold segments.

13 Claims, 3 Drawing Sheets

TIRE MOLD

This application claims benefit of U.S. Provisional Patent Application Ser. No. 63/127,253, filed on Dec. 18, 2020. The teachings of U.S. Provisional Patent Application Ser. No. 63/127,253 are incorporated herein by reference in their entirety.

TECHNICAL FIELD

This invention relates to a tire mold with a tire tread mold portion being divided into a plurality of mold segments. The subject invention also relates to a tire which is molded during its manufacturing process with said mold.

BACKGROUND OF THE INVENTION

Many pneumatic tires are manufactured according to relatively standardized processes and machinery. For example, in many cases, a green tire is inserted into a tire mold where it is cured (vulcanized). The tire mold is designed to shape the tire and to mold the circumferential tread pattern into the tire. The mold is also typically designed to mold written information, such as the tire size, loading information, inflation pressure information, and branding on the sidewall of the tire.

At the time of tire molding, the tire mold is closed by moving circumferential mold segments inward in a tire radial direction. Often each segment has on its inner face a plurality of blades extending into the mold, mostly in the radial direction, and forms a reverse imprint arranged to cut the surface of the green tire according to a desired tread pattern, wherein a blade arranged to protrude from the inner face of the mold segment is cutting a groove or a sipe within the tread of the tire. Then, the tire is subject to vulcanization.

As a consequence, mold blades inserted into the green tire and subsequently removed from the cured tire undergo forces caused by the movement of the rubber around them in both operations. Depending on the position of the blades in the mold segment, forces exerted by the rubber on the blades can be more or less strong. However, strong forces may cause the breakage of the blades during demolding. Generally, the closer the blades are to the transversal edges of the mold segments, the more probable are blade breakages. This is especially the case for blades that extend essentially in a width direction of the mold segment, i.e. the lateral blades or in other words laterally extending blades.

Conventionally, the blades, such as the lateral blades and the circumferential blades, are arranged to project in a direction toward a center of the mold segment, i.e. in the radial direction that corresponds to a direction essentially perpendicular to the inner face of the mold segment. The mold segments are moved in a radial direction that passes through the circumferential center of the mold segment defining also the operating direction. Blades that are positioned centrally with regard to the circumferential direction in the mold segment will project in the operating direction of said segment, but blades positioned at the transverse edges of the mold segment project in a direction forming an angle with the operating direction of the mold segment when extending radially. Thus, during the opening and closing movements of the mold segments, the rubber will generate forces on the surface of the blades to a greater or lesser extent depending on the relative inclination of the blades to the operating direction. When forces applied on the blades become too large, the blades may break. There is a need to improve the situation.

Modern tires comprise complex tread patterns that need to be continuous around the circumference of the tire to improve the tire performances. In particular, for winter tires and/or all-season tires, there is also a need for increasing the number of blades, requiring thinner blades that will be more subject to breakage during molding and demolding operations.

United States Patent Application Publication Number 2009/0035404 (now issued as U.S. Pat. No. 7,628,598 B2) discloses a tire mold with a plurality of radial mold segments with blades arranged in each of the mold segments. The blades positioned at circumferential ends (i.e. the transverse edges) of each segment are inclined outward to the radial direction of the mold segment. The blades can be all parallel and oriented in the movement direction of the mold segment. The risks of damage to the blades are reduced. Nevertheless, this implies leaving a gap between the blades and the mold segment edge or having sipes with smaller height in the vicinity of the edges to allow two mold segments to be moved into contact with one another. This is likely to form a gap in the tread pattern, so that there is a need to improve such a design. In addition, difficulties are encountered to close the tire mold without damaging the blades at the mold segment edge by collision with blades of the neighboring segment.

United States Patent Application Publication Number 2006/0008547 (now issued as U.S. Pat. No. 7,201,570 B2) discloses a tire mold with a plurality of radial mold segments. Each mold segment comprises a plurality of pieces partitioned in a tire circumferential direction. The pieces comprise projecting stacks for forming grooves on a tread surface. The pieces are slidable relative to each other in a circumferential direction except the piece that is disposed at the central portion of each mold segment. When moving the mold segment towards the tire, the pieces that are closer to the edge of a mold segment move and rotate toward a non-radial direction parallel to the direction of movement of the mold segment. The use of movable parts comprising blades that are used to shape the tread pattern involves a great complexity and has limited cost efficiency.

There is a need to find a solution that provides more liberty in the design of the tread pattern and at the same time reduces the risks of damaging the blades due to forces exerted during demolding or due to collision during the closure of the tire mold. It would also be desirable to improve the liberty of design of the tread pattern by suppressing at least in part the gap between two consecutive mold segments and/or by increasing the number of blades such as the number of blades that mold the sipes, thereby increasing the density of sipes, while at the same time reducing the risk of breakage of blades, in particular of the blades located at the transversal ends of the mold segments.

SUMMARY OF THE INVENTION

One or more of the above needs can be fulfilled by a tire mold according to one or more of the aspects of the present invention.

According to a first aspect of the present invention, a tire mold is provided, the tire mold comprising a tread mold portion which is divided in a tire circumferential direction into a plurality of mold segments, each mold segment having transverse edges (in particular two or at least two transverse edges) and being movable in a respective operation direction between i) an opened position, in which the mold segments are spaced from each other (or away from each other), and ii) a closed position, in which two neighboring mold segments are in contact with each other by one of their transverse edges, each of the mold segments comprising a plurality of blades for molding laterally extending sipes on a tire tread surface.

At least a first one of said mold segments (a first mold segment) has laterally extending blades located at a first transverse edge, wherein at least a second one of said mold segments (a second mold segment) neighboring said first one of said mold segments has laterally extending blades located at a second transverse edge adjacent to the first transverse edge of the first one of said mold segments, and wherein said laterally extending blades located at the first transverse edge of the first one of said mold segments interlock between (or in other words mesh or engage with) the laterally extending blades located at the second transverse edge of the second one of said mold segments when the mold segments are in the closed position.

According to a second aspect of the invention, a tire mold comprises a tread mold portion which is divided in a tire circumferential direction into a plurality of mold segments each having an inner face (or a radially inner face) curved along the circumferential direction according to an arc (or circular segment) defined by an angle (or center angle) α, each mold segment having transverse edges (in particular two or at least two transverse edges) and being movable in a respective operation direction between (i) an opened position, in which the mold segments are spaced from each other and (ii) a closed position in which two neighboring mold segments are in contact with each other by one of their transverse edges, each of the mold segments comprising a plurality of laterally extending blades (or in other words lateral blades) forming projections from the inner face of the mold segment for molding laterally extending sipes on a tire tread surface. The mold segments have according to their length (in a circumferential direction) a first end portion, a second end portion and a central portion arranged between the first and the second end portions, wherein laterally extending blades of the central portion are extending in the operating direction, and wherein laterally extending blades of one or more of the first end portion and the second end portion are inclined blades that extend in a direction forming an angle β with the operating direction, and wherein the value of the angle β is less than half of the value of the angle α.

Amongst other things, the presence of the above interlocking blades and/or inclined blades at the transverse edges of mold segments allows reducing potential gaps in the tread pattern in areas corresponding to the transverse edges of the mold segments. Moreover, said interlocking or inclined extension of blades helps to reduce forces on the blades during the demolding process, in particular at positions adjacent the transverse edges of the mold segments. Blade breakages and/or losses can be reduced.

One or more of the following embodiments can be used to further define the tire mold according to the first aspect and/or the second aspect of the invention.

In one embodiment, the laterally extending blades located at each transverse edge of a mold segment are the laterally extending blades closest to said transverse edge.

In another embodiment, the tread mold portion comprises from 4 to 20 mold segments, preferably, from 5 to 12 mold segments, more preferably from 6 to 10 mold segments or from 6 to 9 mold segments.

In another embodiment, the circumference is 360° and the value of the angle α is within the range of 90° to 18°, preferably from 72° to 30°, more preferably from 60° to 40°, or from 60° to 20°.

In still another embodiment, the mold segments have according to their length (in particular viewed in the circumferential direction) a first end portion, a second end portion and a central portion located between the first and the second end portions, wherein the central portion has a length ranging from 5% to 50% of the total length of the mold segment, or for example from 10% to 50%; for example, from 10% to 40%; for example, from 15% to 35%; or for example, from 20% to 30%.

In still another embodiment, the mold segments have, according to their length, a first end portion, a second end portion and a central portion located between the first and the second end portions, wherein each of the first end portion and the second end portion has a length ranging from 25% to 47.5% of the total length of the mold segment, or, for example, from 25% to 45%; for example, from 30% to 45%; for example, from 32.5% to 45.5%; or for example, from 35% to 40%. The length of the first end portion and the second end portion can be the same or different.

In another embodiment, at least one mold segment comprises one or more longitudinal ribs or one or more longitudinal blades for molding respectively one or more grooves or one or more sipes extending in the circumferential direction of the tire, and wherein said one or more longitudinal ribs or one or more longitudinal blades are parallel to the operating direction.

In still another embodiment, at least one mold segment is produced by an additive manufacturing process, wherein the additive manufacturing process is preferably 3D printing. In particular, when using a 3D printing process, it may be even more desirable to have less force exerted on blades during demolding of a tire. For instance, such processes may allow for finer and thinner structures or may have less hardness than conventionally used steel blades.

Interlocking Blades

In an embodiment, the laterally extending blades located at the first transverse edge of at least one mold segment are configured to interlock between the laterally extending blades located at the second transverse edge of the neighboring segment when the mold segments are in the closed position.

In another embodiment, the laterally extending blades located at the first transverse edge are not aligned in the circumferential direction with the laterally extending blades located at the second transverse edge. For example, the first transverse edge is devoid of laterally extending blades that face the laterally extending blades located at the second transverse edge and vice versa.

In another embodiment, the number of laterally extending blades located at the first transverse edge is the same or different from the number of laterally extending blades located at the second transverse edge. For example, at least one mold segment comprises a number of laterally extending blades located at the first transverse edge that is greater than the number of laterally extending blades located at the second transverse edge or vice-versa.

In still another embodiment, the number of laterally extending blades located at the first transverse edge and/or at the second transverse edge is smaller than the number of laterally extending blades located directly behind them in the circumferential direction.

Inclined Blades

In an embodiment, each mold segment has an inner face curved along the circumferential direction according to an arc defined by an angle α and at least the laterally extending blades located at one or more of the first and second transverse edges are parallel to the operating direction or extend in a direction forming an angle β with the operating direction wherein the value of the angle β is less than the half of the value of the angle α; preferably, the value of the angle β is at most a third of the value of the angle α; more preferably, the value of the angle β is at most a quarter of the value of the angle α.

In another embodiment, the inclined blades extending in a direction forming an angle β with the operating direction are inclined towards the (circumferential) center of the mold segment. In still another embodiment, the mold segments have according to their length a first end portion, a second end portion and a central portion located between the first and the second end portion, wherein the central portion has a length ranging from 5% to 50% or from 10% to 50% of the total length of the mold segment, and wherein the laterally extending blades of the central portion extend in the operating direction.

Thus, according to an embodiment, from 5% to 50% of the laterally extending blades of at least one mold segment extend in the operating direction; for example, from 10% to 50%, for example, from 10% to 40%, for example, from 15% to 35%, or for example, from 20% to 30%.

According to an embodiment of this invention, at least 20% of the laterally extending blades of at least one mold segment are extending in the operating direction; for example, at least 25%, for example, at least 30%, for example, at least 40%, or for example, at least 50%.

In another embodiment, each mold segment has an inner face curved along the circumferential direction according to an arc defined by an angle α and the mold segments have according to their length a first end portion, a second end portion and a central portion located between the first and the second end portion, wherein each of the first end portion and the second end portion has a length ranging from 25% to 45% of the total length of the mold segment, and wherein the laterally extending blades of the first end portion or of the second end portion or of both the first and second end portions extend in a direction forming an angle β with the operating direction, and wherein the value of the angle β is less than the half of the value of the angle α. Preferably, the value of the angle β is at most a third of the value of the angle α. More preferably, the value of the angle β is at most a quarter of the value of the angle α.

Thus, according to an embodiment, from 25% to 47.5% of the laterally extending blades of at least one mold segment extend in a direction forming an angle β with the operating direction wherein the value of the angle β is less than the half of the value of the angle α; for example, from 25% to 45%, for example, from 30% to 45%, for example, from 32.5% to 45.5%, or for example, from 35% to 40%.

In another embodiment, at least one mold segment comprises one or more laterally extending blades extending in the operating direction, wherein the angle β is continuously decreasing from one laterally extending blade to the next one in the circumferential direction, e.g. from a maximal angle β of laterally extending blades at a transverse edge to an angle zero of the laterally extending blades extending in the operating direction.

In still another embodiment, the value of the angle β is maximal with at most 18°, preferably at most 15°, more preferably at most 12°, and most preferably at most 10°.

Thickness of the Laterally Extending Blades

In an embodiment, each mold segment comprises a plurality of laterally extending blades parallel to the operating direction and a plurality of laterally extending blades inclined relative to the operating direction of said segment, wherein the laterally extending blades that are inclined relative to the operating direction have a thickness superior to the thickness of the laterally extending blades which are parallel to the operating direction.

In another embodiment, the mold segments have according to their length a first end portion, a second end portion and a central portion located between the first and the second end portions, wherein the laterally extending blades of the central portion extend in the operating direction, and wherein the laterally extending blades of the first end portion or the second end portion or of both the first and second end portions are inclined blades that extend in a direction forming an angle β with the operating direction, wherein the angle β is less than half of the angle α; and wherein, optionally, the laterally extending blades that are inclined relative to the operating direction have a thickness superior than the thickness of the laterally extending blades which are parallel to the operating direction and the density of the laterally extending blades in the central portion is superior or larger to the density of the laterally extending blades in the first end portion or in the second end portion or in both the first and second end portions.

In still another embodiment, the thickness of the laterally extending blades that are inclined relative to the operating direction is ranging from 1.05 to 1.50 times the thickness of the laterally extending blades parallel to the operating direction; for example, from 1.10 to 1.40 times; for example, from 1.20 to 1.30 times.

In still another embodiment, the thickness of laterally extending blades to form sipes (wherein the laterally extending blades are inclined relative to the operating direction or not) is at most 0.60 mm; preferably at most 0.55 mm; more preferably at most 0.50 mm; even more preferably at most 0.45 mm; and most preferably at most 0.40 mm.

In still another embodiment, the laterally extending blades are attached to the mold segment with a proximal end and have a free distal end, wherein the laterally extending blades have a constant thickness along their height (i.e. from their proximal end to their distal end) or have a thickness decreasing from their proximal end to their distal end.

In still another embodiment, each mold segment comprises a plurality of laterally extending blades parallel to the operating direction and a plurality of laterally extending blades inclined relative to the operating direction of said segment. The laterally extending blades that are inclined relative to the operating direction have a thickness decreasing from their proximal end to their distal end.

In another embodiment, the thickness of the laterally extending blades at their proximal end is ranging from 1.05 to 1.50 times the thickness of the laterally extending blades at their distal end; for example, from 1.10 to 1.40 times; for example, from 1.20 to 1.30 times. In another embodiment, at least one mold segment comprises one or more laterally extending blades that extend in the operating direction and have a thickness that is said minimal thickness; wherein the laterally extending blades located at a transverse edge (i.e. the first transverse edge and/or the second transverse edge) have a thickness that is said maximal thickness; wherein the thickness of the lateral extending blades is continuously decreasing from one lateral blade to the next one in the circumferential direction, from the maximal thickness of the laterally extending blades located at a transverse edge to the minimal thickness of the laterally extending blades that extend in the operating direction. In still another embodiment, the thickness of the laterally extending blades located at a transverse edge (i.e. at the first transverse edge and/or at the second transverse edge) is the maximal thickness of the blades and the maximal thickness of laterally extending blades, which is preferably at most 0.60 mm; preferably at most 0.55 mm; more preferably at most 0.50 mm; even more preferably at most 0.45 mm; and most preferably at most 0.40 mm.

In yet another embodiment, the maximal thickness of laterally extending blades is at most 0.60 mm for mold segments used to produce tires for passenger cars, but can be at most 0.80 mm in mold segments used to produce tires for light trucks and at most 2.0 mm in mold segments used to produce tires for trucks. An increased thickness helps further to enhance stability of the blades, in particular close to the transverse edges of the mold segments.

Height of the Laterally Extending Blades

In an embodiment, the laterally extending blades are attached to the mold segment by a proximal end and show or have a free distal end, wherein the height of a lateral blade is measured from its proximal end to its distal end. In another embodiment, the mold segments have according to their length a first end portion, a second end portion and a central portion located between the first and the second end portions; and one or more of the laterally extending blades located at the transverse edge of the first end portion or the second end portion or both the first and second end portions, have the same height as the laterally extending blades of the central portion.

In another embodiment, the mold segments have according to their length a first end portion, a second end portion and a central portion located between the first and the second end portions; and at least a part of the laterally extending blades of the first end portion or of the second end portion or of both the first and second end portions, has the same height as the laterally extending blades of the central portion.

In still another embodiment, the mold segments have according to their length a first end portion, a second end portion and a central portion located between the first and the second end portions; and one or more of the laterally extending blades located at the transverse edge in the first end portion or in the second end portion or in both the first and second end portions, has a height smaller than the laterally extending blades of the central portion.

In still another embodiment, the mold segments have according to their length a first end portion, a second end portion and a central portion located between the first and the second end portions; and at least a part of the laterally extending blades in the first end portion or in the second end portion or in both the first and second end portions has a height smaller than the laterally extending blades of the central portion.

In still another embodiment, at least a part of the laterally extending blades in the first end portion or in the second end portion or in both the first and second end portions has a height that is ranging from 0.5 to 0.9 times the height of the laterally extending blades of the central portion; for example, from 0.6 to 0.9 times; for example, from 0.7 to 0.8 times. According to a third aspect, a tire is provided which is molded by the tire mold according to the first aspect or according to the second aspect and/or one or more of their embodiments.

In an embodiment, the tire is a pneumatic tire or a non-pneumatic tire. It is preferred for the tire to be a pneumatic tire. In another embodiment, the tread pattern of the tire can be symmetric or asymmetric. For example, the tire has an asymmetric tread. In another embodiment, the tire has a directional tread pattern.

In still another embodiment, the tire is an all-season tire or a winter tire, with preference a winter tire. For example, the tire is an all-season pneumatic tire or a winter pneumatic tire with preference a winter pneumatic tire. For example, the tire (in particular the tire sidewall) shows a "three-peak mountain snowflake" symbol (i.e. "3PMSF" symbol).

DEFINITIONS

The following definitions are provided for various terms used herein.

The reference throughout this specification to "one embodiment" or "an embodiment" means that a particular feature, structure or characteristic described in connection with the embodiment is included in at least one embodiment of the present disclosure. The particular features, structures, characteristics or embodiments may be combined in any suitable manner, as would be apparent to a person skilled in the art from this disclosure, in one or more embodiments. Furthermore, while some embodiments described herein include some but not other features included in other embodiments, combinations of features of different embodiments are meant to be within the scope of the disclosure and form different embodiments, as would be understood by those in the art.

Unless otherwise defined, all terms used in the disclosure, including technical and scientific terms, have the meaning as commonly understood by one skilled in the art to which this disclosure belongs. By means of further guidance, definitions for the terms used in the description are included to better appreciate the teaching of the present disclosure.

"Asymmetric tread" means a tread that has a tread pattern not symmetrical about the center plane or the equatorial plane of the tire.

"Symmetric tread" means a tread that has a tread pattern symmetrical about the center plane or the equatorial plane of the tire.

"Directional Tread Pattern" means a tread pattern designed for a specific direction of rotation.

"Circumferential" means lines or directions extending along the perimeter of the surface of the annular tread perpendicular to the axial direction.

"Axial" means lines or directions that are parallel to the axis of rotation of the tire.

"Sipes" means slots molded into the tread elements that subdivide the tread surface and improve traction. A sipe is narrower than a groove.

DETAILED DESCRIPTION OF THE INVENTION

A tire mold according to an embodiment of the present invention may be used for molding pneumatic or non-pneumatic tires.

Tire molds are typically made of metal or metal alloy materials, such as aluminum or steel, which can be cast or CNC machined to form the desired negative tread pattern.

Tire mold tread layers can also be made from an additive manufacturing technology, such as 3D printing, which are then coupled to tire mold supports. For example, tire mold tread layers can also be made by metal or metal alloy 3D printing such as steel 3D printing or aluminum 3D printing, preferably steel 3D printing.

Figure 1:
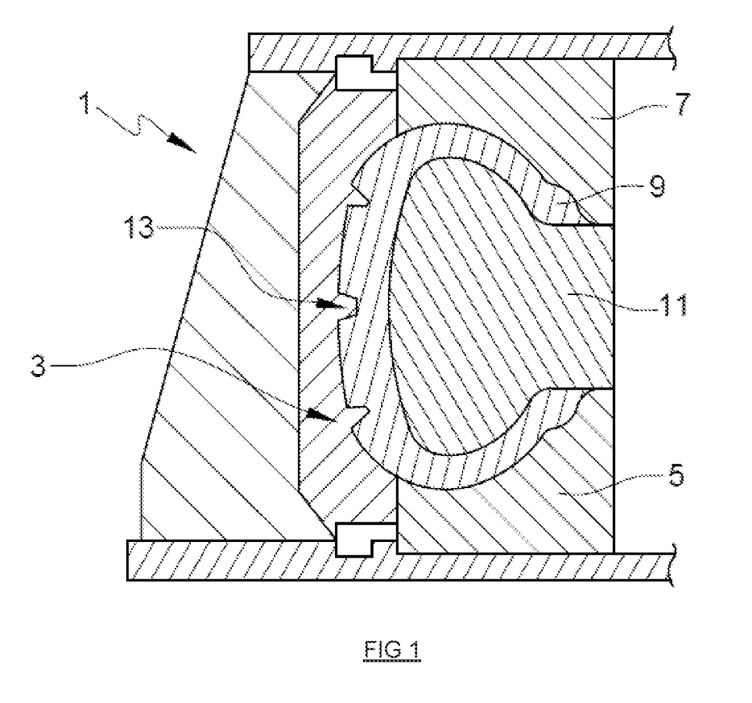
FIG. 1 is a partial cross-sectional view of a tire mold.

Reference is made to FIG. 1 that is a schematic cross-sectional view showing an outline structure of a metallic tire mold 1. The tire mold 1 includes a tread molding section 3 arranged on an outer periphery thereof so as to mold a tread pattern of a tire 9, a lower side molding section 5, and an upper side molding section 7, which mold sidewalls of a green (uncured) tire 9. A green tire 9 is supported on a rigid core 11 and set in the mold 1 upon closing of the respective molding sections or portions 3, 5, 7 in this state to be subject to vulcanizing and molding in the mold 1.

Figure 2:
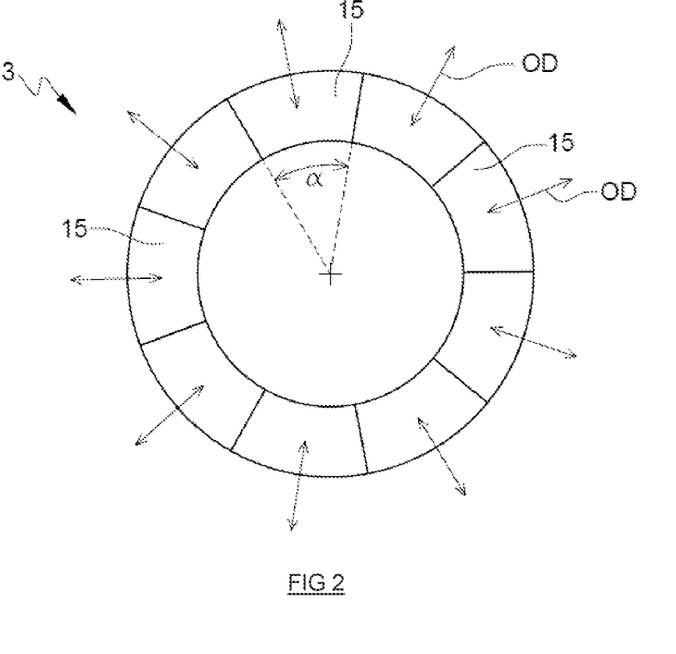
FIG. 2 is a view showing a state in which the tread mold portion is closed.

FIG. 2 shows schematically the tread molding section or portion 3 for molding a tire tread divided in a tire circumferential direction into a plurality of mold segments 15. The tread molding section or portion 3 may comprise from 4 to 20 mold segments 15; preferably, from 5 to 12 mold segments 15; more preferably, from 6 to 10 mold segments 15; and more preferably, from 6 to 9 mold segments 15.

The tread molding section or portion 3 illustrated in FIG. 2 is divided into 9 mold segments 15 which are movable to open and close the tire mold 1. Each mold segment 15 extends along its length about a portion of the tire's circumference, so that each mold segment has an (radially) inner face curved along the circumferential direction according to an arc defined by an angle α. There may be any number of mold segments and all the mold segments may not necessarily be of the same length. However, it is preferred that all mold segments have essentially the same length and cover the same portion of the circumference of the tire. For example, the tire mold 1 has 6 mold segments, each mold segment covers a portion of the tire's circumference defined by an arc with an angle α of 60°. For example, the tire mold has 9 mold segments, each mold segment covering a portion of the tire's circumference defined by an arc with an angle α of 40°. For example, the circumference is 360° and the value of the angle α is ranging from 90° to 18°; preferably from 72° to 30°; and more preferably from 60° to 40° or from 60° to 20°.

Each mold segment 15 can be moved in translation in a radial direction of the molded tire. The direction in which each mold segment 15 is movable is the operating direction of the mold segment 15 and is denoted OD in FIG. 2. Thus, the operating direction is the radial direction of a tire as determined at the center of the mold segment along its length. The operating direction is parallel to the radial direction as determined at the center of the mold segment along its length wherein "parallel" includes small angles from 0° to 8°; for example, from more than 0° to 5° or from 1° to 5° or preferably from 0° to 2°.

Therefore, the mold segments 15 are moved in contraction to close the tire mold and in expansion (i.e. in the opposite direction) to open the tire mold. Each mold segment 15 is therefore movable in a respective operation direction between an opened position wherein the mold segments 15 are spaced from each other (i.e. away from each other) and a closed position wherein two neighboring mold segments 15 are in contact with each other by one of their transverse edges. FIG. 2 shows the tire mold in the closed position wherein the transverse edges of two adjacent mold segments 15 are in contact with each other, in order to form a continuous tread mold portion 3. The transverse edges are preferably perpendicular to the circumferential direction. The transverse edges are preferably straight.

Each mold segment 15 comprises a first transverse edge and a second transverse edge. In case the tread pattern is asymmetrical and/or directional, the mold segment 15 needs to be oriented in the given direction so that the first transverse edge of the mold segment is in contact with the second transverse edge of the neighboring mold segment when the tire mold is closed.

Each mold segment comprises a body with an inner face that molds the tire. It is understood that the inner face of the mold segment will therefore show a corresponding curvature along the length of the mold segment as schematically visible in FIG. 2, but also a curvature along the width of the mold segment as schematically visible in FIG. 1.

The inner face is equipped with a plurality of blades for molding the tread pattern. The blades extend from the inner face into the tire mold. They have one end attached to the inner face (i.e. the proximal end) and one free end (i.e. the distal end). Blades may have any direction depending on the tread pattern that is desired. For example, the mold segments may comprise one or more longitudinal ribs 13 (shown on FIG. 1) to mold circumferential grooves, one or more longitudinal blades to mold circumferential sipes, one or more lateral ribs to mold transversal grooves and one or more laterally extending blades to mold transversal sipes on a tread surface of the green tire. The transversal grooves or sipes extend in directions intersecting circumferential grooves and sipes provided on the tread surface. The transversal grooves or sipes may be not necessarily perpendicular to the circumferential grooves or sipes, i.e. they may extend in directions inclined to the circumferential grooves or sipes. Also, the transversal sipes have a width smaller than the transversal grooves so that the laterally extending blades are thinner than the lateral ribs.

According to an embodiment, at least one mold segment comprises one or more longitudinal ribs or one or more longitudinal blades for molding respectively one or more grooves or one or more sipes extending in the circumferential direction of the tire, and wherein said one or more longitudinal ribs or one or more longitudinal blades are parallel to the operating direction.

Figure 3:
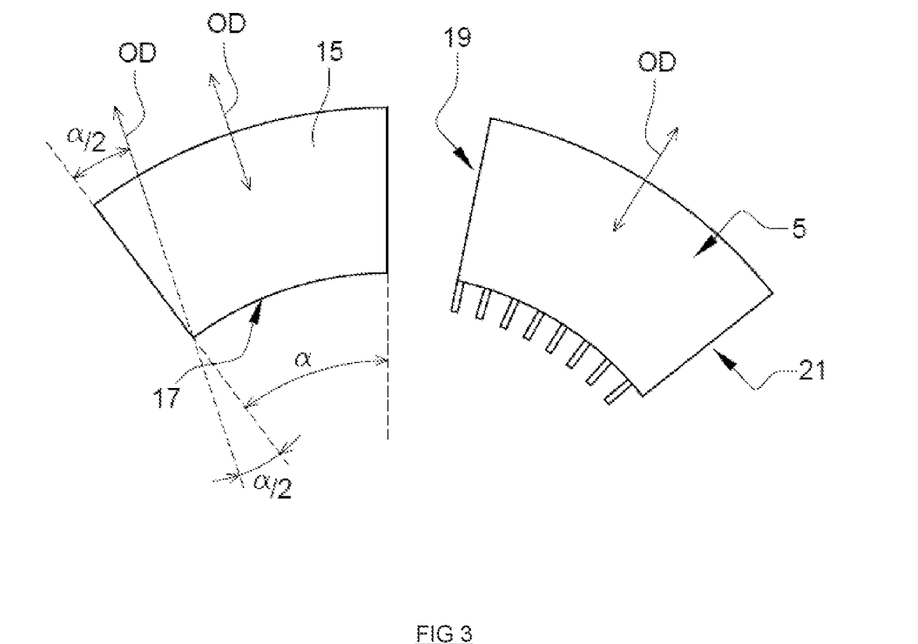
FIG. 3 is a schematic view of mold segments.

As schematically shown in FIG. 3, the mold segments 15 comprise laterally extending blades arranged on the inner face 17 of the mold segment 15. Laterally extending blades may comprise curves or corners but extend mainly in the width direction of the mold segments 15. One or more laterally extending blades to mold transversal sipes on a tread surface of the green tire can be parallel to the axial direction or have an angle with the axial direction that is up to 50°. For example, one or more laterally extending blades extend along the width of the mold segment in a direction that has an angle with the axial direction of the tire that is ranging from 0° to 50°; for example, from more than 0° to 45°; for example, from 0° to 40°; for example, from 1° to 40°; for example, from 5° to 35°; and for example, from 10° to 30°. In an embodiment, one or more laterally extending blades are parallel to the axial direction wherein "parallel" includes small angles from 0° to 8°; for example, from more than 0° to 5° or from 1° to 5°.

It can be understood that the laterally extending blades which are arranged in the middle of the mold segment with respect to its longitudinal direction and which extend from the inner face into the tire mold in the radial direction are parallel to the operating direction of the mold segment. However, any laterally extending blades positioned on the transverse edges of the mold segment and which extend into the tire mold in the radial direction would have an angle with the operating direction with a value of about half the angle α, wherein the angle α corresponds to the arc defining the portion of the tire's circumference covered by the mold segment. Said angle α/2 can be very large, for example, α/2 is up to 30° if the mold comprises 6 mold segments each being defined by an arc with an angle α of 60°. The angle α/2 is up to 20° if the mold comprises 9 mold segments each being defined by an arc with an angle α of 40°. To avoid or at least limit the breakage of the laterally extending blades, the present disclosure provides for adapting the angle of at least a part of the laterally extending blades to be parallel to the operating direction or to form an angle β with the operating direction that is less than α/2 with the angle α being the arc's angle defining the portion of the tire's circumference covered by the mold segment. For example, the angle β is less than 30° for a tire mold comprising 6 mold segments. For example, the angle β is less than 20° for a tire mold comprising 9 mold segments. In an embodiment, the angle β is less than α/3, with preference less than α/4.

In an embodiment, the angle β with the operating direction is at most 18°, preferably at most 15°, more preferably at most 12°, and most preferably at most 10°. The angle β with the operating direction being 0° means that the laterally extending blades extend into a direction parallel to the operating direction. Thus, the angle β with the operating direction is preferably ranging from 5° to less than 20°; for example, from 8° to 18° degrees; or from 5° to 15°.

It is possible to have all the laterally extending blades of a mold segment that extend from the inner face in a direction parallel to the operating direction. However, in an embodiment, at least a part of the laterally extending blades of a mold segment shows an angle β wherein the laterally extending blades are not parallel to the operating direction but have an angle with the operating direction that is reduced by comparison with the angle between the radial direction and the operating direction. The laterally extending blades that have an angle β with the operating direction are hereinafter called the inclined laterally extending blades.

The laterally extending blades are distributed along the length of a mold segment; for example, in rows, e.g. successive rows, wherein the mold segment comprises a first transverse edge and a second transverse edge. The first transverse edge of a mold segment is located in contact with the second transverse edge of the neighboring mold segment when the mold segments are located in their closed position. The laterally extending blades located at a transverse edge are the closest to said transverse edge.

Figure 4:
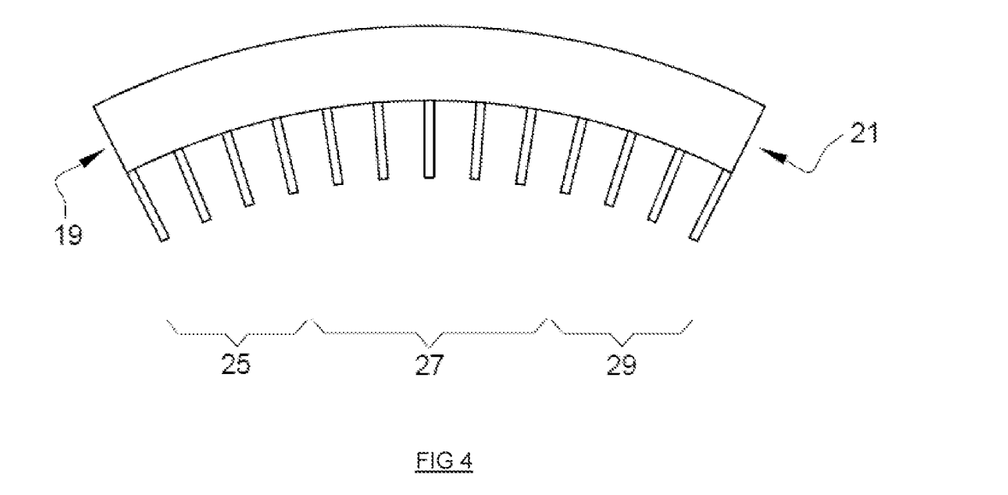
FIG. 4 illustrates the different portions of a mold segment.

As shown in FIG. 4, the mold segment can therefore be divided according to its length between a first end portion 25 that includes the first transverse edge 19 of the mold segment 15, a second end portion 29 that includes the second transverse edge 21 and a central portion 27 located between the first and the second end portions 25, 29. In an embodiment, the central portion 27 has a length ranging from 5% to 50% of the total length of the mold segment; for example, from 10% to 50%; for example, from 10% to 40%; for example, from 15% to 35%; for example, from 20% to 30%. Each of the first end portion 25 and the second end portion 29 can have a length ranging from 25% to 47.5% of the total length of the mold segment; for example, from 25% to 45%; for example, from 30% to 45%; for example, from 32.5% to 45.5%; and for example, from 35% to 40%. The length of the first end portion 25 and the second end portion 29 can be the same or different.

In an embodiment, the laterally extending blades of the central portion 27 extend in a direction parallel to the operating direction, whereas the laterally extending blades of the first end portion 25 and the second end portion 29 extend with an angle β with the operating direction.

For example, all the laterally extending blades of the first end portion 25 or of the second end portion 29 extend in a direction parallel the direction of the laterally extending blades located at the first transverse edge or at the second transverse edge respectively; wherein the laterally extending blades located at the first or second transverse edges 25, 29 form an angle β with the operating direction that is at most 12° or at most 10°.

For example, all the laterally extending blades of the first end portion 25 or the second end portion 29 extend in a direction forming an angle β with the operating direction wherein the angle β is maximal for the laterally extending blades located at a transverse edge and continuously decreases for the next laterally extending blades that are successive in the circumferential direction up to the central portion 27 wherein the laterally extending blades are parallel to the operating direction.

For example, the value of the angle β is continuously decreasing from the laterally extending blades located at a transverse edge to the laterally extending blades that extend according to the operating direction so that the first blades located at a transverse edge show a maximal angle β that is less than α/3, with preference less than α/4. For example, the value of the angle β is maximal, e.g. having at most 18°, preferably at most 15°, more preferably at most 12°, and most preferably at most 10°. For example, the value of the angle β is continuously decreasing from the laterally extending blades located at the transverse edge to the laterally extending blades that extend according to the operating direction so that the laterally extending blades located at a transverse edge (i.e. at the first transverse edge and/or at the second transverse edge) have an angle β with the operating direction which is at most 18°, preferably at most 15°, more preferably at most 12°, and most preferably at most 10°.

Having at least a part of the laterally extending blades parallel to the operating direction allows using thinner blades since they are less subjected to lateral forces. Thus, according to an embodiment, each segment comprises a plurality of laterally extending blades parallel to the operating direction and a plurality of laterally extending blades inclined relative to the operating direction of said segment. The inclined blades have a thickness superior to the thickness of the laterally extending blades which are parallel to the operating direction. For example, the thickness of an inclined blade is ranging from 1.05 to 1.50 times the thickness of the laterally extending blades parallel to the operating direction, with preference from 1.10 to 1.40 times or from 1.20 to 1.30 times. The use of thinner blades on at least the central portion 27 of the mold segment allows increasing the number of blades and as a result, may increase the overall performance of the tire. The use of thicker blades on the first and second end portion allows increasing the resistance to breakage of these laterally extending blades.

As a consequence, the density of the laterally extending blades in the central portion 27 may be superior to the density of the laterally extending blades in the first end portion 25 or in the second end portion 29 or in both the first and second end portions. Indeed, the density of the laterally extending blades can be uniform along the mold segment or can be greater in the central portion 27 when the thickness of the laterally extending blades is smaller in the central portion 27.

Thus, at least 20% of the laterally extending blades of at least one mold segment may be in the central portion; for example, at least 25%; for example, at least 30%; for example, at least 40%; for example, at least 50% or at least 55%. It is understood that when the density of the laterally extending blades is greater in the central portion, the central portion 27 covering 50% of the total length may comprise more than 50% of the laterally extending blades for example.

Figure 5:
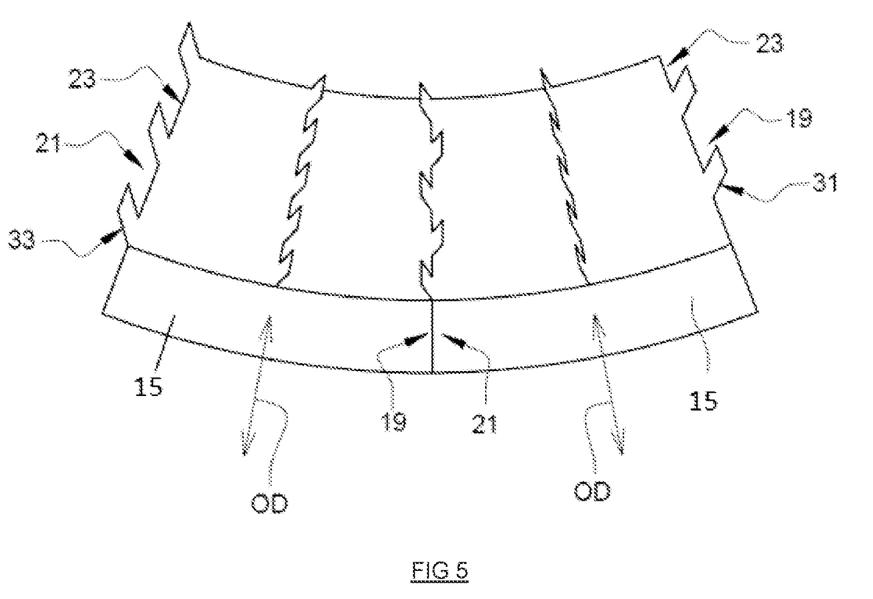
FIG. 5 illustrates the interlocking laterally extending blades.

To allow the laterally extending blades to be as close as possible to the transverse edge, and as shown in FIG. 5, the laterally extending blades located at the transverse edge of a mold segment 15 are configured to interlock between the laterally extending blades located at the transverse edge of the neighboring mold segment 15 when the mold segments 15 are located in their closed position. This configuration allows having the laterally extending blades located at a transverse edge to extend in a direction different from the radial direction and at the same time to close the mold without damaging said laterally extending blades. In the non-limiting embodiment of FIG. 5, only 3 rows of laterally extending blades are schematically represented for each mold segment 15, i.e. located at each transverse edge and at the median (i.e. central) plane.

Interlocking blades means that the one or more laterally extending blades 31 of the first transverse edge of a mold segment 15 are not aligned in the circumferential direction with the one or more laterally extending blades 33 located at the second transverse edge 21 of the neighboring mold segment 15 so that they can engage or mesh with each other. In an embodiment, at least one of the first or second transverse edge comprises a single lateral blade. In an embodiment that can be alternative or complementary, at least one of the first or second transverse edge comprises more than one lateral blade.

It is preferred that a mold segment 15 comprises at its first transverse edge 19 one or more laterally extending blades 31 configured to interlock with one or more laterally extending blades 33 located at the second transverse edge 21 of the neighboring mold segment 15, the one or more laterally extending blades 31 located at the first transverse edge 19 are not aligned in the circumferential direction with the laterally extending blades 33 located at the second transverse edge 21. For example, the first transverse edge 19 is devoid of laterally extending blades that face the one or more laterally extending blades 33 located at the second transverse edge 21 and vice versa. Reference 23 on FIG. 5 illustrates the free space between two laterally extending blades that may be left in the axial direction. Since some laterally extending blades are not present at a transverse edge, the number of laterally extending blades located at the first transverse edge and/or at the second transverse edge is lower than the number of laterally extending blades located directly behind them in the circumferential direction.

The laterally extending blades 31, 33 located at the first transverse edge 19 and at the second transverse edge 21 are distributed along the width of the mold segment 15, for example, in an alternating manner. Thus, the first transverse edge 19 of a mold segment 15 shows a distribution of laterally extending blades 31 that is complementary to the distribution of laterally extending blades 33 located at the second transverse edge 21 of the neighboring mold segment 15. For example, all the mold segments 15 of the tire mold are similar and each have the distribution and/or the number of the laterally extending blades 31 located at the first transverse edge 19 being different from the distribution and/or the number of the laterally extending blades 33 located at the second transverse edge 21. For example, at least one mold segment comprises a number of laterally extending blades located at the first transverse edge that is greater than the number of laterally extending blades located at the second transverse edge or vice-versa. The mold segments 15 are therefore asymmetric with regards to the number and/or distribution of laterally extending blades at each of their transverse edges 19, 21.

The use of interlocking laterally extending blades located at the transverse edges of the mold segments may allow them to have the same height as the laterally extending blades located in the central portion of the mold segment. The laterally extending blades are attached to the mold segment by a proximal end and show a free distal end; and the height of a lateral blade is measured from its proximal end to its distal end. However, it is also possible to have laterally extending blades of the first end portion 25 and/or the second end portion 29 that are smaller in height than the laterally extending blades located in the central portion 27. It is also possible that only the laterally extending blades located at each transverse edge have a smaller height. For example, at least a part of the laterally extending blades in the first end portion 25 or in the second end portion 29 or in both the first and second end portions has a height that is ranging from 0.5 to 0.9 times the height of the laterally extending blades of the central portion 27; for example, from 0.6 to 0.9 times; and for example, from 0.7 to 0.8 times.

The laterally extending blades can have the same thickness or a different thickness. To improve the robustness of the inclined laterally extending blades, it is possible that they show a greater thickness. For example, the thickness of the laterally extending blades that are inclined relative to the operating direction is ranging from 1.05 to 1.50 times the thickness of the laterally extending blades parallel to the operating direction; for example, from 1.10 to 1.40 times; and for example, from 1.20 to 1.30 times. For instance, the thickness of laterally extending blades to form sipes, wherein the laterally extending blades are inclined relative to the operating direction or not, is at most 0.60 mm; preferably at most 0.55 mm; more preferably at most 0.50 mm; even more preferably at most 0.45 mm; and most preferably at most 0.40 mm.

For example, the thickness of laterally extending blades to form sipes, wherein the laterally extending blades are inclined relative to the operating direction or not, is at most 0.60 mm for mold segments used to produce tires for passenger cars, but can be at most 0.80 mm in mold segments used to produce tires for light trucks and at most 2.0 mm in mold segments used to produce tires for trucks. Persons having ordinary skilled in the art can adapt the teaching of the disclosure to any size of tire. For example, the laterally extending blades that are inclined relative to the operating direction have a thickness superior to the thickness of the laterally extending blades which are parallel to the operating direction. This also allows using thinner laterally extending blades when they extend in the operating direction and therefore to increase the density of the laterally extending blades for example in the central portion.

For example, the mold segments have according to their length (i.e. according to the circumferential direction) a first end portion, a second end portion and a central portion located between the first and the second end portion; wherein the laterally extending blades of the central portion are extending in the operating direction, and wherein the laterally extending blades of the first end portion 25 or the second end portion 29 or of both the first and second end portions are inclined blades that extend in a direction forming an angle $\beta$ with the operating direction wherein the angle $\beta$ is less than half of the angle $\alpha$; wherein the laterally extending blades that are inclined relative to the operating direction have a thickness superior than the thickness of the laterally extending blades which are parallel to the operating direction and the density of the laterally extending blades in the central portion is superior to the density of the laterally extending blades in the first end portion 25 or in the second end portion 29 or in both the first and second end portions.

Figure 6:
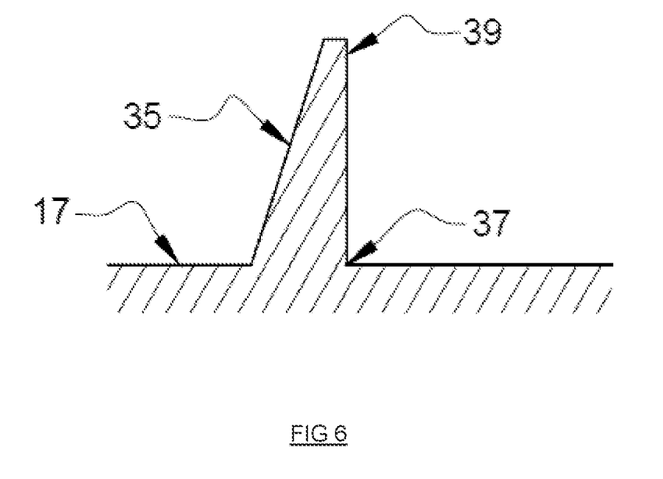
FIG. 6 is cross-sectional view of a lateral blade with a decreasing thickness.

For example, the laterally extending blades are attached to the mold segment by a proximal end and have a free distal end, wherein the laterally extending blades have a constant thickness along their height (i.e. from their proximal end to their distal end) or have a thickness that is decreasing from their proximal end to their distal end as shown on FIG. 6. For the laterally extending blades 35 having a thickness that is decreasing from their proximal end 37 to their distal end 39, the thickness of the laterally extending blades refers to the thickness shown by the laterally extending blades at its proximal end 37 unless explicitly stated otherwise. For example, the thickness of the laterally extending blades at their proximal end is ranging from 1.05 to 1.50 times the thickness of the laterally extending blades at their distal end; for example, from 1.10 to 1.40 times; for example, from 1.20 to 1.30 times.

As shown in FIG. 6, the laterally extending blades 35, having a thickness that is decreasing from their proximal end 37 to their distal end 39, may show on each face a different angle with the inner face 17 of the mold segment. For example, each mold segment comprises a plurality of laterally extending blades parallel to the operating direction and a plurality of laterally extending blades inclined relative to the operating direction of said segment. Furthermore, the laterally extending blades that are inclined relative to the operating direction have a thickness that is decreasing from their proximal end to their distal end.

For example, at least one mold segment comprises one or more laterally extending blades that extend according to the operating direction; wherein the thickness of two consecutive laterally extending blades aligned in the circumferential direction is continuously decreasing from the maximal thickness of the laterally extending blades located at a transverse edge to the minimal thickness of the laterally extending blades that extend according to the operating direction.

For example, the thickness of the laterally extending blades located at a transverse edge is the maximal thickness of the laterally extending blades and/or the maximal thickness of laterally extending blades is at most 0.60 mm, preferably at most 0.55 mm, more preferably at most 0.50 mm, even more preferably at most 0.45 mm, and most preferably at most 0.40 mm.

The invention has been described with reference to preferred embodiments. Potential modifications and alterations will occur to others upon a reading and understanding of this description. It is to be understood that all such modifications and alterations are included in the scope of the disclosure as set forth in the appended claims, or the equivalents thereof. The illustrations and corresponding descriptions are not intended to restrict or limit the scope of the appended claims in any way.

What is claimed is:

1. A tire mold comprising a tread mold portion which is divided in a tire circumferential direction into a plurality of mold segments, each mold segment having transverse edges and being movable in a respective operation direction between (i) an opened position, in which the mold segments are spaced from each other, and (ii) a closed position, in which two neighboring mold segments are in contact with each other by one of their transverse edges, each of the mold segments comprising a plurality of blades for molding laterally extending sipes on a tire tread surface; wherein at least a first one of said mold segments has laterally extending blades located at a first transverse edge, wherein at least a second one of said mold segments neighboring said first one of said mold segments has laterally extending blades located at a second transverse edge adjacent to the first transverse edge of the first one of said mold segments, and wherein said laterally extending blades located at the first transverse edge of the first one of said mold segments interlock between the laterally extending blades located at the second transverse edge of the second one of said mold segments when the mold segments are in the closed position.

2. The tire mold according to claim 1, wherein each mold segment has an inner face curved along the circumferential direction according to an arc defined by an angle $\alpha$ and at least the laterally extending blades located at one or more of the first and second transverse edges are parallel to the operating direction or extend in a direction forming an angle $\beta$ with the operating direction wherein the value of the angle $\beta$ is less than half of the value of the angle $\alpha$.

3. The tire mold according to claim 2, wherein at least one mold segment comprises one or more laterally extending blades extending in the operating direction; wherein one or more of the following is true: (1) the angle $\beta$ is continuously decreasing from one laterally extending blade to the next one in the circumferential direction, from a maximal angle $\beta$ of laterally extending blades at a transverse edge to an angle zero of the laterally extending blades extending in the operating direction; or (2) the thickness of the laterally extending blades is continuously decreasing from one laterally extending blade to the next one in the circumferential direction, from a maximal thickness of laterally extending blades located at a transverse edge to a minimal thickness of the laterally extending blades extending in the operating direction.

4. The tire mold according to claim 1, wherein the mold segments have according to their length a first end portion, a second end portion and a central portion between the first and the second end portions; wherein the central portion has a length ranging from 10% to 50% of the total length of the mold segment, and wherein the laterally extending blades of the central portion are extending in the operating direction.

5. The tire mold according to claim 1, wherein each mold segment has an inner face curved along the circumferential direction according to an arc defined by an angle $\alpha$ and the mold segments have according to their length a first end portion, a second end portion and a central portion between the first and the second end portion; wherein each of the first end portion and the second end portion has a length ranging from 25% to 45% of the total length of the mold segment; and wherein the laterally extending blades of one or more of the first end portion and the second end portion extend in a direction forming an angle $\beta$ with the operating direction, wherein the value of an angle $\beta$ is less than the half of the value of the angle $\alpha$.

6. The tire mold according to claim 1, wherein each mold segment comprises a plurality of laterally extending blades parallel to the operating direction and a plurality of laterally extending blades inclined relative to the operating direction of said segment, and further wherein the laterally extending blades that are inclined relative to the operating direction have a thickness superior to the thickness of the laterally extending blades which are parallel to the operating direction.

7. The tire mold according to claim 6, wherein the thickness of the laterally extending blades that are inclined relative to the operating direction is ranging from 1.05 to 1.50 times the thickness of the laterally extending blades parallel to the operating direction.

8. The tire mold according to claim 1, wherein the laterally extending blades are attached to the mold segments by a proximal end and have a free distal end, wherein each mold segment comprises a plurality of laterally extending blades parallel to the operating direction and a plurality of laterally extending blades inclined relative to the operating direction of said segment, and further wherein the laterally extending blades inclined relative to the operating direction have a thickness that is decreasing from their proximal end to their distal end.

9. The tire mold according to claim 1, wherein the mold segments have according to their length a first end portion, a second end portion and a central portion between the first and the second end portions, and at least one of the laterally extending blades of one or more of the first end portion and the second end portion have the same height as the laterally extending blades of the central portion.

10. The tire mold according to claim 1, wherein the tire mold has one or more of: the laterally extending blades located at the first transverse edge unaligned in the circumferential direction with the laterally extending blades located at the second transverse edge; a number of the laterally extending blades located at the first transverse edge different from a number of the laterally extending blades located at the second transverse edge; a number of the laterally extending blades located at one of the first transverse edge and the second transverse edge being lower than a number of laterally extending blades located directly behind them in the circumferential direction.

11. The tire mold according to claim 1, wherein at least 20% of the laterally extending blades of at least one mold segment extend in the operating direction and/or wherein each mold segment has an inner face curved along the circumferential direction according to an arc defined by an angle $\alpha$ with the angle $\alpha$ ranging from 60° to 40°.

12. The tire mold according to claim 1, wherein at least one mold segment comprises one or more longitudinal ribs or one or more longitudinal blades for molding respectively one or more grooves or one or more sipes extending in the circumferential direction of the tire, and wherein said one or more longitudinal ribs or one or more longitudinal blades are parallel to the operating direction.

13. A tire mold according to claim 1 wherein at least one mold segment is made by 3D printing.

* * * * *